United States Patent

Beard et al.

[15] 3,665,772
[45] May 30, 1972

[54] WINDSHIELD WIPER MOTOR LINK DEPRESSED PARK MECHANISM

[72] Inventors: Kenneth A. Beard, Ann Arbor; Theodore W. Daykin, Dearborn; Gordon H. Jagger, Highland Park, all of Mich.

[73] Assignee: Ford Motor Company, Dearborn, Mich.

[22] Filed: Sept. 11, 1970

[21] Appl. No.: 71,532

[52] U.S. Cl..............................................74/75, 15/250.27
[51] Int. Cl.............................................................F16h 21/40
[58] Field of Search.............................74/75, 527; 15/250.27

[56] References Cited

UNITED STATES PATENTS 2,733,609  2/1956  Latta ...........................................74/75
2,489,626  11/1949 Doucette ....................................74/527
2,945,385  7/1960  Nelson.........................................74/75

Primary Examiner—William F. O'Dea
Assistant Examiner—Wesley S. Ratliff, Jr.
Attorney—John R. Faulkner and John J. Roethel

[57] ABSTRACT

A windshield wiper drive mechanism that functions to park the windshield wiper arms and blades outside the normal run pattern, i.e., in a depressed park position, by extending the effective wiper motor output arm radius. The effective output arm radius is controlled through a rotation sensitive, spring-loaded, double latch means carried on an eccentric interposed between the output arm and a driving link connected to the wiper arm linkage.

4 Claims, 6 Drawing Figures

Patented May 30, 1972  3,665,772

INVENTORS.
Kenneth A. Beard
Theodore W. Daykin
Gordon H. Jagger
BY
John R. Faulkner
John J. Roethel
ATTORNEYS

WINDSHIELD WIPER MOTOR LINK DEPRESSED PARK MECHANISM

BACKGROUND OF THE INVENTION

The present invention is concerned with a windshield wiper drive mechanism having provision for parking the windshield wiper arms and blades outside the normal run or wipe pattern or in what is commonly referred to as a depressed park position. The desirability of a depressed park position for the wiper blades is well documented in the prior art. Basically, the purpose is to position the blades when not in use below the line of sight through the windshield by bringing the blades down to the top of the reveal molding or, in the case of the concealed part wiper systems, below the level of the upper surface of the cowl.

The prior art discloses at least two ways to mechanically achieve a depressed park system which may be categorized as (1) a direction-sensitive linkage-lengthening arrangement and (2) a crank arm varying mechanism. U.S. Pat. No. 2,717,518, issued Sept. 13, 1955 to Edward Latta, is exemplary of a direction-sensitive linkage-lengthening arrangement for use in depressed parking of windshield wipers. U.S. Pat. No. 2,866,344, issued Dec. 30, 1958 to Elmer E. Reese, discloses a mechanical movement for actuating a windshield wiper and particularly a crank assembly for converting rotation to oscillation including means for varying the throw of a crank so as to vary the amplitude of oscillation imparted to the wiper blades.

The mechanism disclosed herein has characteristics of both types but for purposes of description will be considered as being primarily a crank arm varying mechanism in which the depressed park feature is achieved by increasing the windshield wipe pattern during the park cycle by extending the wiper motor output arm radius. It is an object of the present invention to provide a simplified and positive acting mechanism adapted to accomplish the desired result.

SUMMARY OF THE INVENTION

The windshield wiper drive mechanism embodying the present invention has a shaft rotatable by a reversible motor. A wiper motor output arm is fixed to the shaft and carries a drivepin. The mechanism also includes a driving link coupled to a wiper arm linkage. Interposed between the output arm and the driving link is an eccentric, the latter being rotatable about the drivepin and the driving link being rotatably coupled to the eccentric for rotation about an axis displaced from the axis of rotation of the eccentric about the drivepin.

The effective output arm radius for normal wiper pattern operation is the distance from the shaft axis to the drivepin and for depressed park position the effective output arm radius is increased by the distance between the drivepin and the axis rotation of the driving link on the eccentric. The improvement embodied in the present invention comprises a double latch device carried by the eccentric having a pair of spring-loaded latch elements which lock the output arm to the eccentric in the depressed park or maximum output arm radius condition of the output arm. Upon initiation of the run cycle from depressed park position of the wiper arm one of the latch elements unlocks while the other remains locked until the end of the first half cycle of the run cycle is reached to restore the effective output arm radius to normal wipe pattern radius. The second latch element then unlocks the eccentric from the arm and locks the eccentric to the drivelink. With the eccentric locked to the drivelink, relative rotation of the eccentric about the drivepin occurs and a normal wiper pattern sweep of the wiper arm is obtained.

DESCRIPTION OF THE DRAWINGS

Further features and advantages of the present invention will be explained in greater detail making reference to the description, which now follows, reference being had to the drawings, in which.

DETAILED DESCRIPTION OF THE INVENTION

Figure 1:
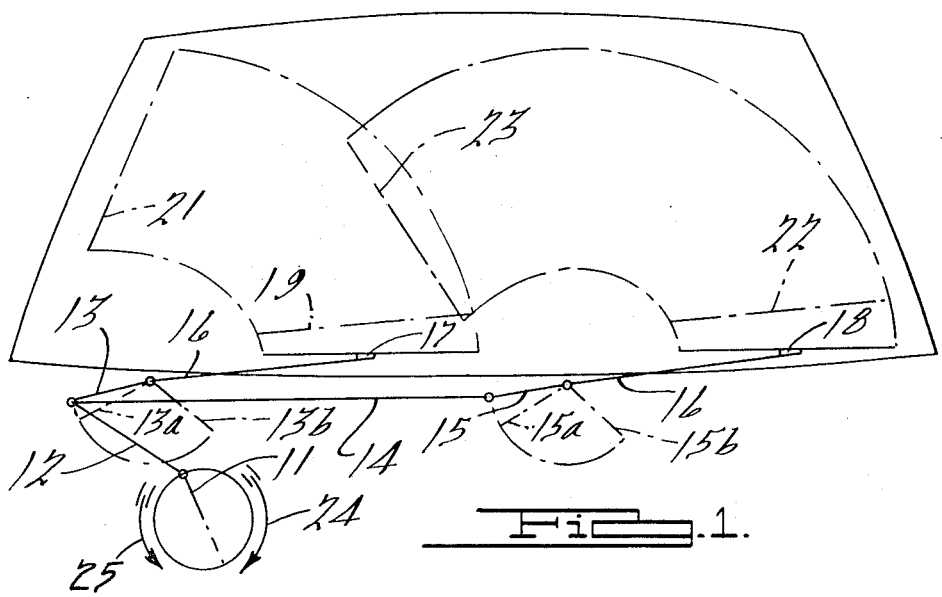
FIG. 1 is a diagrammatic view of the windshield wipe pattern of the windshield wiper drive mechanism embodying the present invention.

Referring now to the drawings, FIG. 1 diagrammatically illustrates the wiper pattern to be controlled by the windshield wiper drive mechanism, generally designated 10, embodying the present invention. FIG. 1 is a view as seen from the inside of the vehicle looking toward the front through the windshield. The directions of rotation and swinging movement will be described from this viewpoint.

The output arm 11 of the drive mechanism is connected to a drivelink 12 through an eccentric and latch means to be hereinafter described. The drivelink 12 is connected to a wiper linkage system that includes a pivoted link 13 and a transfer link 14 connected to a second pivoted link 15. The pivoted links 13 and 15 are in turn connected to the support arms 16 for the left side wiper blade 17 and for the right side wiper blade 18 which are shown in their depressed or park position.

The normal wiper pattern for the left side wiper blade 17 extends from the line 19 to the line 21 and for the right side wiper blade 18 from the line 22 to the line 23. Stated another way, the lines 19 and 22 correspond to the 0° rotation position of the output arm 11. When the latter has travelled through 180° of rotation, the wipers 17 and 18 reach the positions indicated by the lines 21 and 23, respectively. As the output or crank arm 11 completes 360° of rotation the wipers 17 and 18 return to the positions indicated by the lines 19 and 21, respectively. As noted, the wipers 17 and 18 are shown in their parked position which is a position somewhat below the positions indicated by the lines 19 and 21. This park position is obtained by reverse rotation of the output arm 11.

Figure 2:
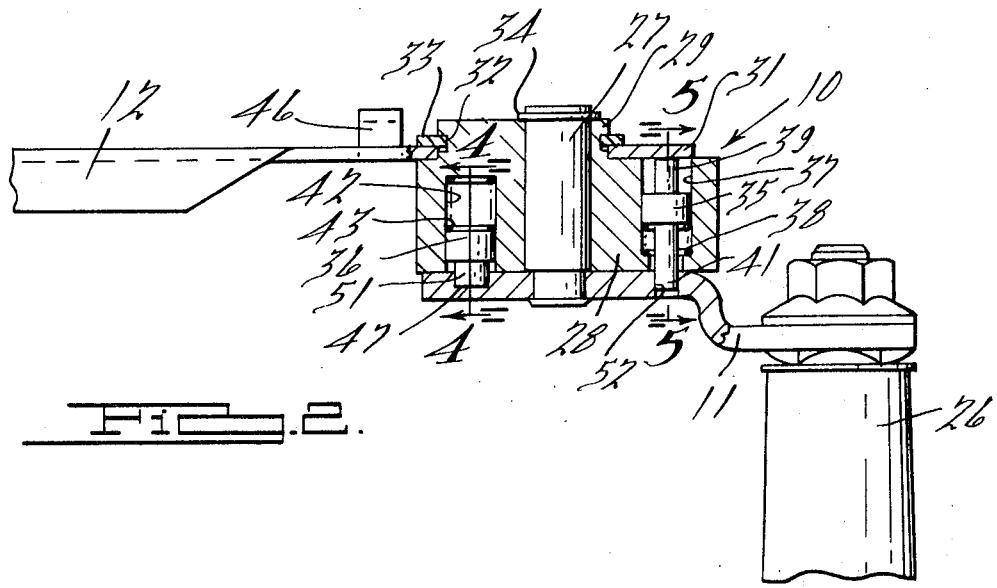
FIG. 2 is a vertical section of the eccentric and latch means for varying the output arm effective radius.
Figure 3:
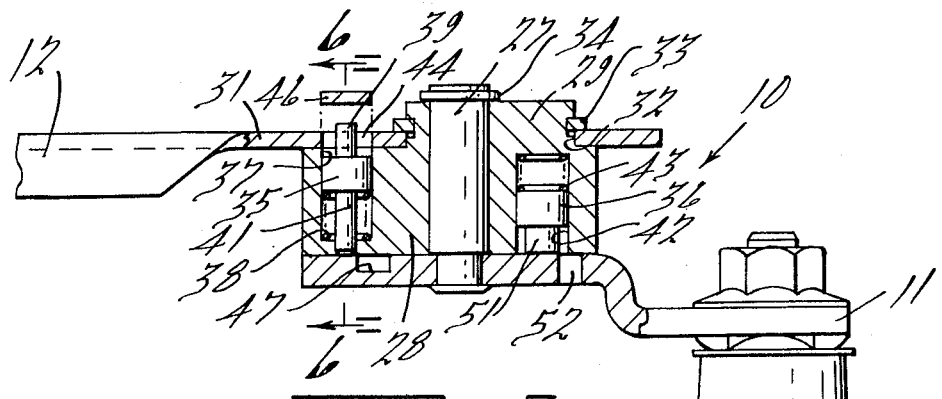
FIG. 3 is a view in part similar to FIG. 2 illustrating the eccentric and latch means in a second operative position.

In FIG. 1, the normal or run cycle of the output arm 11 is indicated by the arrow 24 and the reverse or park cycle of the output arm 11 is indicated by the arrow 25. During normal or run cycle wiper pattern oscillation the pivoted link 13 travels between the dotted lines 13a and 13b and the pivoted link 15 between the dotted lines 15a and 15b. To drive the wiper blades to the park positions 17 and 18, respectively, it is necessary to drive the pivoted links 13 and 15 to the solid line positions shown in FIG. 1. In the wiper drive mechanism embodying the present invention, this is accomplished by increasing the output arm 11 effective radius in a manner best explained with reference to FIGS. 2 and 3. Referring first to FIG. 3, the components of the drive mechanism 10 are shown in normal wipe pattern drive position. First, it should be explained that the output or crank arm 11 is secured to the windshield wiper system motor output shaft 26. The motor is a reversible electric motor and is controlled by circuitry which upon the "on" switch being actuated causes it to rotate in a run cycle drive direction, i.e., in a clockwise direction as indicated by the arrow 24 in FIG. 1. When the "on" switch is turned back to the "off" position, the motor reverses direction and rotates in a counterclockwise direction as indicated by the arrow 25 in FIG. 1. The motor is stopped at a predetermined position to park the wiper blade against the bottom edge of the windshield. As an example of the manner in which the motor operation may be so controlled, reference may be made to U.S. Pat. application Ser. No. 735,135, filed June 6, 1968 by Eugene C. Gagnon et al. now U.S. Pat. No. 3,532,952 issued Oct. 6, 1970, for "Internal Switching Mechanism to Reverse and Dynamically Brake the Motor for Parking the Wipers."

The crank arm 11 carries a drivepin 27 about which an eccentric 28 is rotatably journalled. The eccentric 28 has an upwardly projecting cylindrical extension 29 the center or axis of which is laterally off-set from the axis of the drivepin 27. The drivelink 12 is provided at its end 31 shown in FIG. 3 with a circular aperture 32 which fits over the cylindrical extension 29 of the eccentric 28. A snap ring 33 holds the drivelink end 31 on the eccentric 28 and the latter is held on the drivepin 27 by a second snap ring 34. With the foregoing arrangement, the axis of rotation of the eccentric 28, as determined by the drivepin 27 is in fixed, spaced, parallel relation to the axis of the shaft 26.

A latch means including a pair of latch elements or latch pins 35 and 36, is carried on the eccentric 28, the latch elements 35 and 36 being located on diametrically opposite sides of the drivepin 27. The latch element or pin 35 has an intermediate shoulder portion bearing against the wall of a cylindrical aperture 37 extending through the body of the eccentric. The over-all length of the latch element or pin 35 is longer than the height of the eccentric. The latch element or pin 35 is spring-loaded by a spring 38 and is urged in a direction so that its upper end 39 projects above the eccentric into abutting relationship with the underside of the drivelink end 31. The lower end 41 of the latch element or pin 35 normally rides on the upper surface of the output or crank arm 11.

Figure 6:
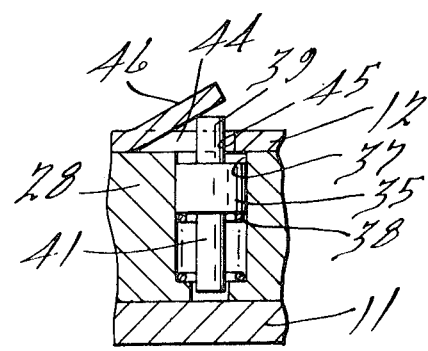
FIG. 6 is an enlarged section view on the line 6—6 of FIG. 3.

The second latch element or pin 36 also has an intermediate shoulder portion bearing against the wall of a cylindrical aperture 42 in the body of the eccentric. This latch element or pin is spring-loaded by a spring 43 which urges the pin downwardly against the upper surface of the output or crank arm 11. The end 31 of the drivelink 12 has an aperture 44 which is formed by shearing and bending a section out of the plane of the link as best seen in FIG. 6. This provides an abutment edge 44 against which the latch pin upper end 39 abuts on clockwise rotation of the drive mechanism. A ramp 45 leads to the abutment edge.

With the latch element or pin 35 in the relationship to the driving link 12 as shown in FIGS. 1 and 6, rotation of the output or crank arm 11 in a clockwise direction results in the eccentric 28 and the link 12 orbiting about the wiper motor output shaft 26, the orbital path being a circular path having a radius equal to the distance between the drivepin 27 and the axis of the motor output shaft 26. This output arm radius produces the normal wipe pattern of the wiper blades.

Upon reverse rotation of the output or crank arm 11, the one pin 35 remains in the FIG. 6 relationship to the drivelink until the other pin 36 drops into a depression 47 having an abutment edge 48 and a ramp 49 leading downwardly to the base of the depression, the latter being located on a circle having a radius equal to the radial distance of the latch pin 36 from the drivepin 27. When the output or crank arm 11 direction is reversed, the friction between the eccentric 28 and the drivelink 12 as well as the resistance of the pin 35 against climbing the ramp 46 is greater than the resistance against relative movement of the eccentric 28 to the output arm 11.

Figure 4:
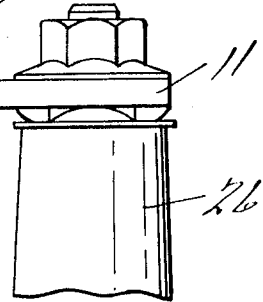
FIG. 4 is an enlarged section view on the line 4—4 of FIG. 2.
Figure 4:
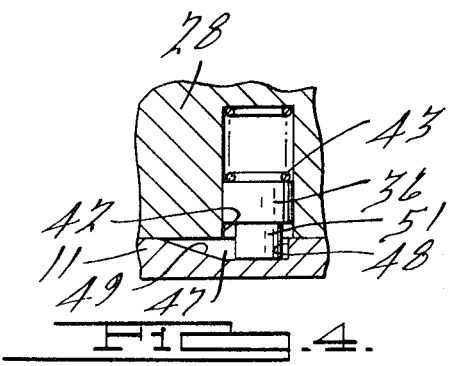

As soon as the lower end 51 of the pin 36 lines up with the depression 47, the spring 43 drives the pin down the ramp 49 into abutment with the edge 48 and the condition shown in FIG. 4 is reached. At the same time, the lower end 41 of the latch element or pin 35 reaches a position of alignment with an aperture 52 in the output or crank arm 11. This occurs at the start of the last half cycle of the reverse rotation of the motor shaft 26.

With the eccentric 28 locked to the output or crank arm 11 by the latch element 36, continued rotation of the output or crank arm 11 through the last half cycle of the reverse rotation results in the eccentric being moved rotatably relative to the drivelink. The upper end 39 of the pin 35 is driven downwardly under the ramp 46 on the drivelink forcing its lower end 41 into the aperture 52 so that the eccentric is locked to the output or crank arm 11 by both latch elements or pins 35 and 36, respectively. This occurs during the first few degrees of rotation of the crank arm in the last half cycle of its reverse rotation.

The end 31 of the link 12 is now rotatable relative to the eccentric 28 about the cylindrical extension 29 thereon. The result is that the link is bodily pushed away from the axis of rotation of the motor shaft 26. The axis or center of the cylindrical extension 29 in effect moves from the right side of the drivepin 27 axis shown in FIG. 3 to the left side of the latter as shown in FIG. 2. Upon reaching a maximum position of displacement, the motor control circuitry is timed to stop the motor and, accordingly, the reverse rotation of the output or crank arm 11.

Figure 5:
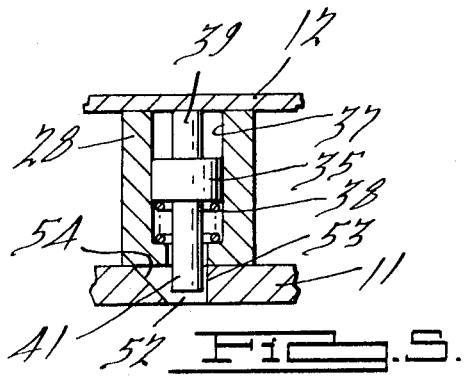
FIG. 5 is an enlarged section view on the line 5—5 of FIG. 2.

As seen in FIG. 5, the aperture 52 into which the lower end 41 of the latch element or pin 35 is forced has an abutment edge 53 and a ramp surface 54 leading thereinto.

When the windshield wiper motor is started up after the wiper blades have been in a parked position, the first thing that happens is that the latch element or pin 36 unlocks. That is, the lower end 51 backs away from the abutment edge 48 of the depression 47. The latch pin 35, however, remains in the aperture 52 since it is blocked from moving out of the aperture by the fact that the upper end is in abutting relation to the underside of the drivelink 12. During the first half cycle of the clockwise rotation the drivelink 12 rotates around the eccentric cylindrical extension 29 until at the end of the first half cycle the latch pin or element 35 again is in alignment with the depression 44 and the drivelink 12. The spring 38 then becomes effective to drive the pin 35 upwardly to the relationship shown in FIG. 6. The eccentric then is completely unlatched or unlocked from the output or crank arm 11. It is now, however, rotatable about the drive pin 27 with the end 31 of the drivelink and moves the latter and the wiper linkage in normal run cycle or normal wiper pattern oscillation movement.

As the eccentric 28 rotates about the drivepin 27 the latch element or pin 36 will run over the depression 47 during each revolution. It merely drops into the recess 47 and then rides up the ramp 49 to the upper surface of the output or crank arm 11 without effecting the operation of the wiper drive mechanism. A slight clicking noise might be audible each time this occurs but since the wiper drive mechanism is mounted on the engine compartment side of the fire wall of the vehicle, this noise will not be noticeable within the passenger compartment.

It is to be understood that this invention is not limited to the exact construction illustrated and described above but that various changes and modifications may be made without departing from the spirit and scope of the invention as defined in the appended claims.

We claim:

1. A windshield wiper drive mechanism having a shaft rotatable by a reversible motor, a wiper motor output arm on the shaft, a drivepin fixed to the output arm, a driving link adapted to be coupled to a wiper arm linkage, and an eccentric interposed between the output arm and the driving link, the eccentric being rotatable about the drivepin and the driving link being rotatably coupled to the eccentric for rotation about an axis displaced from the axis of rotation of the eccentric about the drivepin, the effective output arm radius in normal wipe pattern of a wiper arm being the distance from the shaft axis to the drivepin and in depressed park position being this distance increased by the distance between the drivepin and the axis of the driving link on the eccentric, wherein the improvement comprises:

a double latch device carried by the eccentric having a pair of spring-loaded latch elements both of which lock the output arm to the eccentric in the depressed park or maximum radius condition of the output arm, the spring-loaded latch elements comprising latch pins located on diametrically opposite sides of the drivepin, the first one of the latch elements to unlock upon initiation of a run cycle being located on the outboard side of the drivepin relative to the motor shaft, the second latch element prior to initiation of the run cycle being located between the drivepin and shaft, the output arm having a ramp engageable with the first one of the latch elements upon initiation of the run cycle to drive the latter against the spring-loading to unlocked position, upon initiation of the run cycle from depressed park position of the wiper arm the first one of the latch elements unlocking while the second remains locked until the end of the first half of the run cycle is reached to restore the effective output arm radius to normal wipe pattern radius, the second latch element then unlocking the eccentric from the arm and locking the eccentric to the drivelink, with the eccentric locked to the drivelink relative rotation of the eccentric about the drivepin occurs and a normal wiper pattern sweep of the wiper arm is obtained.

2. A windshield wiper arm drive mechanism according to claim 1, in which:

the second latch element is spring-loaded toward the driving link and is held in engagement with the output arm by its engagement with the underside of the driving link until the latter is rotated to a position in which the second latch element is aligned with an aperture in the driving link, the aperture having a ramp contiguous thereto effective to cam the second latch element out of the aperture upon reversal of the direction of rotation of the output arm.

3. A windshield wiper drive mechanism having a shaft rotatable by a reversible motor, a crank arm fixedly secured to the shaft, a drivepin on the crank arm, an eccentric rotatably journalled on the drivepin, the axis of rotation of the eccentric about the drivepin being in fixed, spaced and parallel relation to the axis of the shaft, and a driving link rotatably coupled at one end to the eccentric and at its other end to a wiper arm linkage, wherein the improvement comprises:

a latch means including latch elements shiftable in directions paralleling the drivepin axis to fixedly connect the eccentric to the crank arm or to fixedly connect the eccentric to the driving link depending on the direction of rotation of the crank arm, the latch elements comprising a pair of biased latch pins slidable in the eccentric and located on diametrically opposite sides of the drivepin about which the eccentric is rotatable, at least one of the pins having abutting engagement with an abutment on the crank arm in one position of the eccentric and the other having abutting engagement with an abutment on the driving link in a second position of the eccentric, the distance between the axis of rotation of the crank arm and the axis of rotation of the driving link on the eccentric and therefor the effective length of the crank arm being controlled by the latched relationship of the eccentric to the driving link or to the crank arm, respectively.

4. A windshield wiper drive mechanism having a shaft rotatable by a reversible motor, a crank arm fixedly secured to the shaft, a drivepin on the crank arm, an eccentric rotatably journalled on the drivepin, the axis of rotation of the eccentric about the drivepin being in fixed, spaced and parallel relation to the axis of the shaft, and a driving link rotatably coupled at one end to the eccentric and at its other end to a wiper arm linkage, wherein the improvement comprises:

a latch means including latch elements shiftable in directions paralleling the drivepin axis to fixedly connect the eccentric to the crank arm or to fixedly connect the eccentric to the driving link depending on the direction of rotation of the crank arm, the distance between the axis of rotation of the crank arm and the axis of rotation of the driving link on the eccentric and therefor the effective length of the crank arm being controlled by the latched relationship of the eccentric to the driving link or to the crank arm, respectively, the latch elements comprising a pair of latch pins slidably journalled in the eccentric on opposite sides of the axis of rotation of the latter about the drivepin, a first spring means biasing one of the latch pins toward the drivelink and a second spring means biasing the other latch pin toward the crank arms, a first abutment on the driving link positioned to abut the one latch pin and having a ramp leading thereto, the first abutment being effective to engage the one latch pin to lock the eccentric to the driving link upon rotation of the crank arm in normal windshield wiper oscillation drive direction and the ramp leading thereto being effective to cam the latch pin out of locking position upon reverse rotation of the crank arm, and a second abutment on the crank arm positioned to abut the other latch pin and having a ramp leading thereto, the second abutment being effective to engage the other latch pin to lock the eccentric to the crank arm upon reverse rotation of the latter which locking action occurs at a position of the wiper arm corresponding to the start of a wipe cycle, further rotation in reverse direction causing the eccentric to bodily shift the driving link away from the crank arm axis of rotation to drive the wiper arm below its normal wipe cycle start position into a depressed park position.

* * * * *